(12) United States Patent
Braudes et al.

(10) Patent No.: US 9,026,090 B2
(45) Date of Patent: May 5, 2015

(54) ADVANCED PRESENCE STATES FOR COLLABORATION APPLICATIONS

(71) Applicant: Avaya Inc., Basking Ridge, NJ (US)

(72) Inventors: Robert E. Braudes, Erie, CO (US); Ignacio Miranda, Madrid (ES)

(73) Assignee: Avaya Inc., Basking Ridge, NJ (US)

( * ) Notice: Subject to any disclaimer, the term of this patent is extended or adjusted under 35 U.S.C. 154(b) by 116 days.

(21) Appl. No.: 13/871,104

(22) Filed: Apr. 26, 2013

(65) Prior Publication Data
US 2014/0323099 A1    Oct. 30, 2014

(51) Int. Cl.
*H04M 3/42*    (2006.01)

(52) U.S. Cl.
CPC ................. *H04M 3/42365* (2013.01)

(58) Field of Classification Search
None
See application file for complete search history.

(56) References Cited

U.S. PATENT DOCUMENTS

| 7,570,752 | B2 | 8/2009 | Jachner | |
|---|---|---|---|---|
| 8,682,973 | B2 * | 3/2014 | Kikin-Gil et al. | 709/204 |
| 2004/0142709 | A1 * | 7/2004 | Coskun et al. | 455/466 |
| 2007/0005704 | A1 * | 1/2007 | Heron et al. | 709/206 |
| 2007/0081644 | A1 * | 4/2007 | Jachner | 379/106.01 |
| 2007/0130260 | A1 * | 6/2007 | Weintraub et al. | 709/204 |
| 2007/0189487 | A1 | 8/2007 | Sharland et al. | |
| 2009/0216851 | A1 * | 8/2009 | Digate et al. | 709/206 |
| 2012/0150789 | A1 * | 6/2012 | Jhoney et al. | 706/52 |
| 2012/0306996 | A1 | 12/2012 | Iyer et al. | |
| 2013/0110565 | A1 * | 5/2013 | Means et al. | 705/7.11 |

OTHER PUBLICATIONS

Feature Overview of Microsoft Lync Server 2010: Presence. www.allcomputers.us/windows_server/feature-overview-of-microsoft-lync-server-2010---presence.aspx. Jul. 24, 2011. 5 pgs.

* cited by examiner

*Primary Examiner* — Erika A Washington
(74) *Attorney, Agent, or Firm* — Sheridan Ross P.C.

(57) ABSTRACT

The system and method determine an activity associated with a user. An action associated with a media type of the activity or a role of the user within the activity is determined. For example, the activity can be how much the user talks during a conference call or if the user's role is that of a moderator. In response to determining the action associated with the media type of the activity or the role of the user within the activity, a presence state of the user is modified. The modified presence state is then communicated to a second user. This allows for a more accurate presence state of the user. It also allows other users to make contact at times where the user is more likely to communicate.

20 Claims, 4 Drawing Sheets

ADVANCED PRESENCE STATES FOR COLLABORATION APPLICATIONS

TECHNICAL FIELD

The systems and methods relate to collaboration systems and in particular to collaboration systems that use presence.

BACKGROUND

Today, the use of presence is starting to become more pervasive in communication systems. For example, Instant Messaging and some web sites use a presence state of the user to indicate if a user is online or offline. This use of presence is convenient to know if someone is online and if they can be contacted. Some systems go even further to identify if someone is present based on their calendar.

However, these limited uses of presence may cause problems based what specifically the person is doing or their role within an activity. For example, if the user's calendar indicates that he is on a conference call, the presence state will indicate that the user is busy. The problem is that the user may wish to be contacted during the conference call; this is because the user's role or activity within the conference may allow contact from others. What is needed is a system that takes into consideration the roles and activities of a user to further define their presence state.

SUMMARY

Systems and methods are provided to solve these and other problems and disadvantages of the prior art. The system and method determine an activity associated with a user. An action associated with a media type of the activity or a role of the user within the activity is determined. For example, the activity can be how much the user talks during a conference call or if the user's role is that of a moderator. In response to determining the action associated with the media type of the activity or the role of the user within the activity, a presence state of the user is modified. The modified presence state is then communicated to a second user. This allows for a more accurate presence state of the user. It also allows other users to make contact at times where the user is likely able communicate.

DETAILED DESCRIPTION

Figure 1:
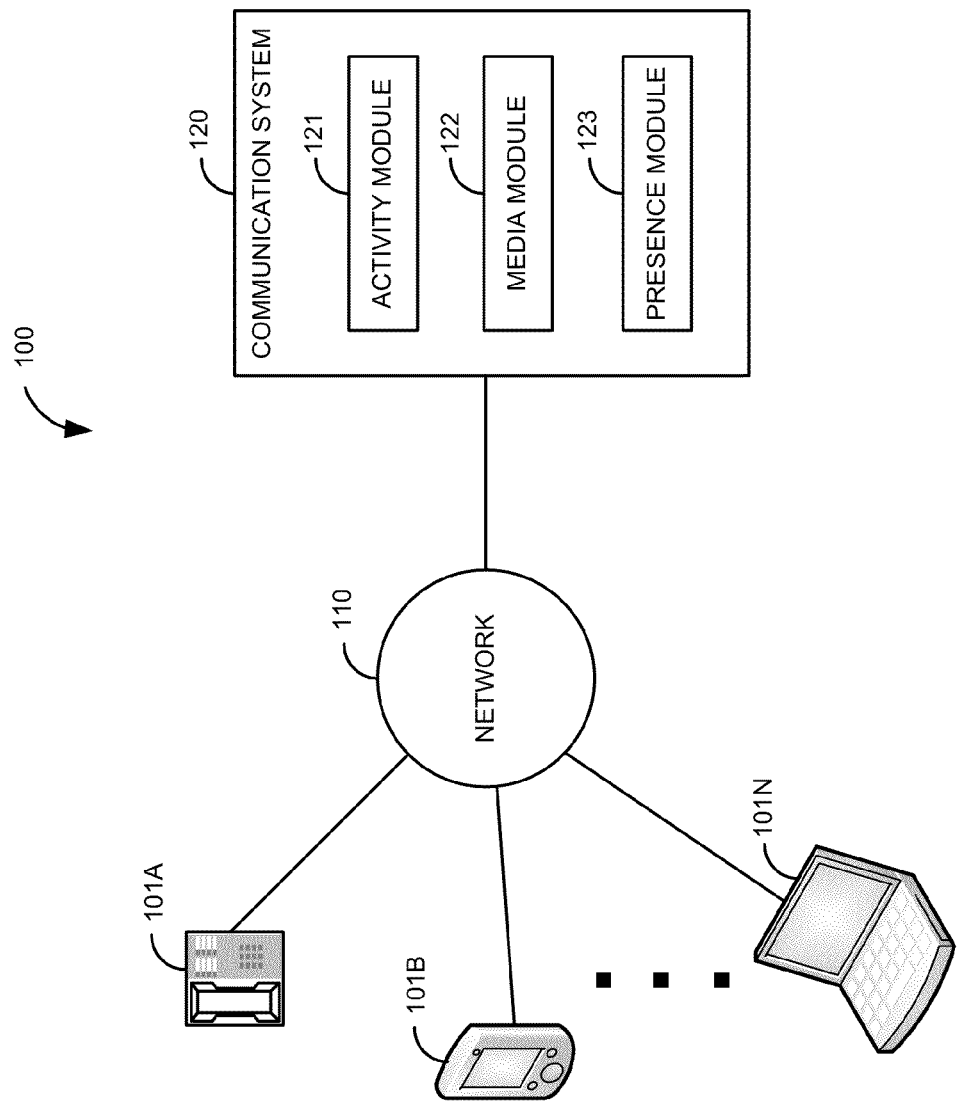
FIG. 1 is a block diagram of a first illustrative system for providing advanced presence states.

FIG. 1 is a block diagram of a first illustrative system 100 for providing advanced presence states. The first illustrative system 100 comprises communication devices 101A-101N, a network 110, and a communication system 120.

The communication devices 101A-101N may be any device that can communicate on the network 110, such as a Personal Computer (PC), a telephone, a video system, a cellular telephone, a Personal Digital Assistant (PDA), a tablet device, a notebook device, and the like. As shown in FIG. 1, any number of communication devices 101A-101N may be connected to the network 110, including only a single communication device 101. In addition, the communication devices 101A-101N may be directly connected to the communication system 120.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), and/or the like.

The communication system 120 may be any communication system that can send and receive information from the communication devices 101A-101N, such as a Private Branch Exchange (PBX), an email system, a text messaging system, an Instant Messaging system, a telephone switch, a central office switch, a voice conference bridge, a video conference bridge, a video server, a media server, an audio server, and/or the like. The communication system 120 comprises an activity module 121, a media module 122, and a presence module 123.

The activity module 121 can be any hardware/software that can determine various activities and/or roles of a user, such as calendaring system, a video system, an audio system, an RFID scanner, an email system, an authentication system, an Instant Messaging system, a GPS system, a scanner, a combination of these, and the like. The media module 122 can be any hardware/software that can provide media services, such as a PBX, an email system, an Instant Messaging system, a video server, a video bridge, an audio bridge, a telephone system, and/or the like. The presence module 123 can be any hardware/software that can determine a person's presence, such as a video camera, an audio system, a login process, a GPS system, an RFID scanner, and/or the like. Although the activity module 121, the media module 122, and the presence module 123 are shown as part of communication system 120, the activity module 121, the media module 122, and the presence module 123 may distributed throughout network 110 or in communication devices 101A-101N.

The activity module 121 is configured to determine an activity associated with a user. An activity associated with the user can be a meeting, a video conference, an audio conference, a telephone call, an Instant Message session, a viewing of a recorded video stream, a text session, a schedule event, a spontaneous event, a viewing of a stream of a live event, a viewing of a television program, and/or the like. The Activity can be determined in various ways, such as from the user's calendar, from information in an email, from information in a voice message, from a transcript of a telephone call, from information in a text message, from information in a Instant Message session, from information in a video call, based on the user making a call, based on the user receiving an incoming call, based on the user viewing a live video stream, based on the user viewing a recorded video stream, based on the user viewing a multimedia conference, and/or the like.

The presence module 123 is configured to determine a presence state of the user. The presence state can be any presence state that indicates a status of the user. For example the presence state may be available, busy, busy, but interruptible, away, on vacation, appear offline, and the like. It is noteworthy that the criteria of the media type and roles are examples of attributes upon which presence state can be determined; other activities that are tied to an activity such as location of the activity (e.g. home, local office, remote office, airplane, etc.) or specific activity (e.g. in a meeting, skydiving, pleasure reading, work reading, etc.) may be equally used to determine presence state.

The media module 122 is configured to determine an action associated with a media type of the activity or a role of the user associated with the activity. An action associated with the media type of the activity can be any type of activity associated with a media type. For example, the action associated with the media type of the activity may be a percentage of time that a user is talking during an audio or video communication.

The role of the user associated with the activity can be any role of the user within an activity. For example, the role of the user in a conference/communication may be a moderator, a presenter, a participant, a required participant, a scribe, an optional participant, a viewer, an active participant, a passive participant, and/or the like.

The presence module 123 is configured to modify a presence state of the user in response to determining the action associated with the media type of the activity or the role of the user associated with the activity. The presence module 123 communicates the modified presence state of the user to another user. The presence module 123 may send the presence state using various protocols. For example, the Session Initiation Protocol (SIP) and the Extensible Message and Presence Protocol (XMPP), which use Presence Information Data Format (PIDF), RFC 3863 and the Rich Presence Extensions to PIDF (RPID) RFC 4480 may be used to communicate the presence state of the user.

The presence state can vary based on configuration and/or user/administrator preferences that are defined in a profile. For example, the presence state can defined based on a condition, which can indicate that the user is available, available on a specific medium(s), busy, but interruptible, busy, but interruptible on a specific medium(s), not available, but available at a specific later time, interruptible for specific person(s), and the like.

To illustrate, consider the following examples. In one embodiment, the role of the user within the activity is determined. In this example, the activity of the user is a conference call and the role of the user is a moderator of the conference call. The user presence state is initially available until the conference call. The activity (conference call) and role (moderator) can be determined, for example, from a calendar event of the user. The user calls into a conference bridge (the media module 122 in communication system 120) from the communication device 101A. The media module 122 determines the role of the first user as a moderator of the conference call. Based on the user's role of moderator, the presence module modifies the initial presence state of available to busy and not interruptible due to the fact that the user is a moderator and does not want to be disturbed during the conference call. This may include directing all incoming calls to voice mail and not notifying the user of emails/Instant Messages on his PC or cellular phone until the completion of the conference call. The particular presence state for the user may be defined based on specific user preferences. The modified presence state is then communicated to other users.

To further illustrate, consider a second user in the same conference. However, instead of being the moderator, the second user's role is that of a participant. The second user calls into the conference bridge (the media module 122) using the communication device 101B. The activity module 121 determines the activity (the conference call) from the second user's calendar. The media module 122 determines, from the calendar, that the second user role is that of a participant. Based on this determination, the presence module 123 modifies the second user's initial presence state of available, to busy, but interruptible. In this example, the incoming calls, emails, and Instant messages can be provided to the second user if the user has set his preferences to do so. The modified presence state is then communicated to other users.

In another embodiment, the system determines an action associated with a media type of the activity. For example, the activity is a video conference call and the action associated with the video conference call is a percentage of time that the user is talking during the video conference call. The user calls into a video conference bridge (media module 122) in communication system 120 via communication device 101N. The presence module 123 modifies the presence state to one setting if the user is talking more than a specific percentage of time and to a different setting if the user is talking less than the specific percentage of time. For example, if the percentage is 10% and the user is talking more than 10% of the time, the presence state is set to busy. If the user is talking at less than 10% the presence state is set to busy, but interruptible. If the user is not talking at all and his phone is muted, the presence state may be set to not busy.

In addition, the presence state can be dynamically changed based on how much the user is talking throughout the video conference. For example, if the user is talking at a high percentage during the first of the conference, the user's presence state during the first of the conference can be set to busy. Later on, if the user stops talking (e.g., based on a change of subject), the user's presence state can be changed to not busy.

Figure 2:
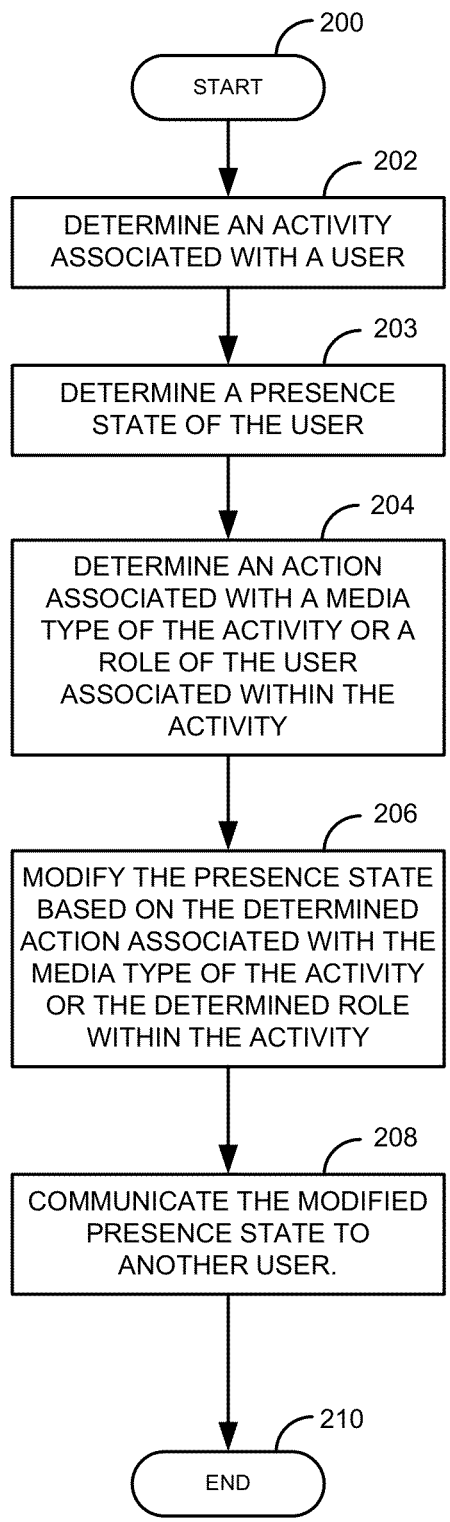
FIG. 2 is a flow diagram of a method for providing advanced presence states.
Figure 3:
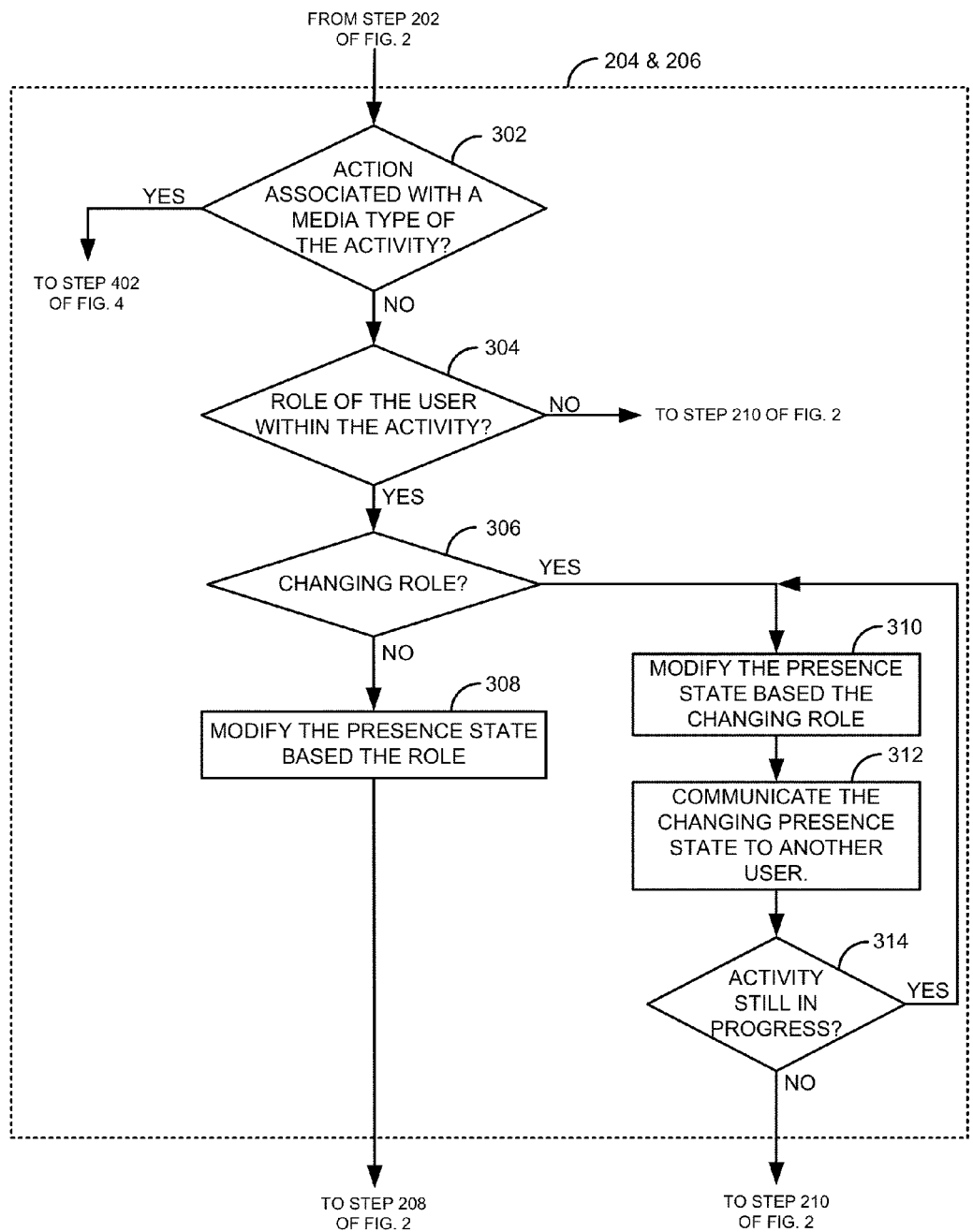
FIG. 3 is a flow diagram of a method for providing advanced presence states based on different conditions.
Figure 4:
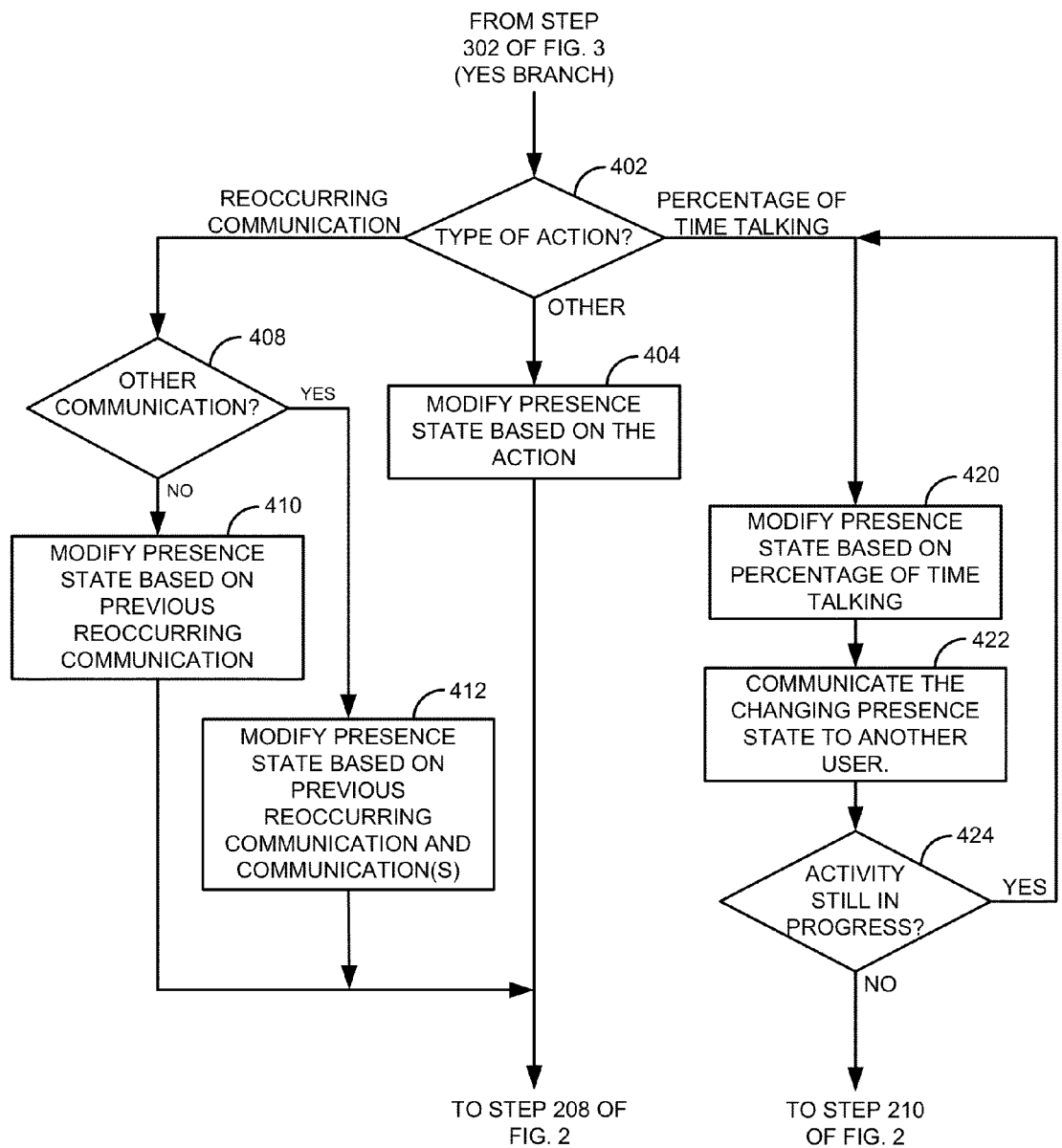
FIG. 4 is a flow diagram of a method for providing advanced presence states based on an action.

FIG. 2 is a flow diagram of a method for providing advanced presence states. Illustratively, the communication devices 101A-101N, the communication system 120, the activity module 121, the media module 122, and the presence module 123 are stored-program-controlled entities, such as a computer or processor, which perform the methods of FIGS. 2-4 and the processes described herein by executing program instructions stored in a tangible computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The process determines 202 an activity associated with a user. The process determines 203 a presence state of the user. The process determines 204 an action associated with a media type of the activity or a role of the user associated with the activity. The process modifies 206 a presence state of the user in response to determining the action associated with the media type of the activity or the role of the user associated within the activity. The process communicates 208 the modified presence state of the user to another user.

FIG. 3 is a flow diagram of a method for providing advanced presence states based on different conditions. The method described in FIG. 3 is an exemplary embodiment of steps 204 and 206 of FIG. 2. After determining an activity associated with the user in step 202, the process determines in step 302 if there is an action associated with a media type of the activity. If there is an action associated with the media type of the activity in step 302, the process goes to step 402 in FIG. 4.

Otherwise, if the process determines in step 302 that there is not an action associated with media type of the activity, the process goes to step 304. The process determines in step 304 if there is a role of the user within the activity. If there is not a role of the user within the activity in step 304, the process goes to step 210 of FIG. 2. Otherwise, the process goes to step 306.

In step 306, the process determines if the role of the user changes. The role of the user in an activity can change over time. For example, the role of the user may change based on a defined agenda in a conference call. During a conference call, the user's role may initially be presenter during a first portion of the agenda. Later on, after presenting, the users's role may then change to participant while another person presents. The user's role can again change where the person now moderates a discussion session at the end of the conference.

If the user's role does not change within the activity in step 306, the process modifies 308 the presence state based on the role and goes to step 208 of FIG. 2. For example, if the user will always be a moderator during the conference call, the presence state is modified based on the user being a moderator for the full duration of the conference call (e.g., by setting the user's presence state to busy). In another embodiment, if the user's role is an optional participant, the user's presence state can be set differently (e.g., by setting the user's presence state to available).

Otherwise, if the user's role changes during the activity in step 306, the process modifies 310 the presence state based on the changing role. The process communicates 312 the changed presence state to another user. The process determines in step 314 if the activity is still in progress. If the activity is still in progress in step 314, the process goes to step 310 to modify the presence state based on the role. This way the process can iteratively check to see if the user's role has changed during the activity. If the activity is no longer in progress in step 314, the process goes to step 210 of FIG. 2. The process can determine if the activity is in progress in various ways, such as based on a calendar event, if the user has exited a communication, based on a gesture, based on a spoken word, based on an action of the user, and/or the like.

In an embodiment, where there are changing roles of the user, the user has the ability to change their role via a user interface, such as a graphical user interface or a voice interface. In still other embodiments, the process can monitor the activity for keywords, key images (e.g., a specific slide in a presentation), or gestures to determine when the user's role changes.

To illustrate, consider the following example. The process determines via a video camera that the user is presenting at a meeting (i.e., via facial recognition) to an audience. The video camera determines the role of the user. While the user is on stage and presenting a presentation, the video camera first determines the user's role is a presenter. Later, when the user stops presenting and sits down, the video camera determines that the role of the user has changed from presenter to observer. When this occurs, the presence state is changed. For example, the presence state can be changed from unavailable to contactable via text only. When the conference is over, the user's presence state can be changed from contactable via text only to available.

FIG. 4 is a flow diagram of a method for providing advanced presence states based on an action. After determining there is an action associated with a media type of the activity in step 302, the process determines in step 402, the type of action. If the action is a reoccurring communication in step 402, the process goes to step 408. A reoccurring communication can be any type of communication that repeats. For instance, a reoccurring communication may be a regularly scheduled voice or video conference, a regular meeting via Instant Message, a regular meeting of participants in at a social networking site, a regular meeting of participants in a meeting room, and the like.

In step 408, the process can optionally determine if there are other communication(s) associated with the reoccurring communication. For example, the user may have sent emails, sent text messages, received voicemails, left voicemails, made voice calls, received voice calls, been involved in Instant Message sessions, made a video call, received a video call, and the like that are based on the reoccurring communication. If there are other communication(s) associated with the reoccurring communication in step 408, the process modifies 412 the presence state based on the previous reoccurring communication and the communication(s) associated with the reoccurring communication. The process then goes to step 208 of FIG. 2.

If the there are not any other communications in step 408, the process modifies 410 the presence state based on a previous one (or more) of the reoccurring communications and the process goes to step 208 of FIG. 2. The one or more reoccurring communications that are used typically is the last communication. However, any one of the prior reoccurring communications may be used. How the presence state is modified based on the previous reoccurring communication(s) may vary. For example, the presence state may be modified based on how much the user participated in the previous occurrence of the reoccurring communication, the user's role in the previous occurrence of the reoccurring communication, and the like. The presence state may be modified based on an action taken during the previous occurrence of the reoccurring communication, such as the user presenting in the communication, being a moderator during the communication, muting the communication, pausing the communication, taking other calls during the communication, sending emails during the communication, responding to Instant Messaging during the communication, typing during the communication, and/or the like.

To further illustrate, consider the following example. The user has a regularly schedule conference call with her group at 10:00 AM on Mondays. During the previous week, the user made an unusually high number of emails and voice calls based on the upcoming conference call with her group. Based on the unusually high number of communications associated with the upcoming conference call, the process modifies the user's presence state for the upcoming conference to busy instead of busy, but interruptible. The process can look for keywords within the communications to further refine the presence state. For example, presence state of the user may be changed to available if the communications indicate that the conference call is going to be canceled (even though it is was not canceled from the user calendar).

If the action in step 402 is a percentage of time the user is talking during the communication, the process modifies 420 the presence state based on the percentage of time the user is talking. The process communicates 422 the changed presence state to another user. The process determines if the activity is still in progress in step 424. If the activity is still in progress in step 424, the process goes to step 420. This way the process can iteratively determine how much the user is talking during activity. If the activity is not still in progress in step 424, the process goes to step 210 of FIG. 2. The percentage of time that the user is talking can be determined based on various factors, such as a percent of the total time of the activity, a moving average, an average over a specific time period of the activity, and/or the like.

If the action in step 402 is another type of action, the process modifies 404 the presence state based on the action.

The process then goes to step 208 of FIG. 2. The other type of action can include various types of actions. For example, the action can be where the user is listening to a recorded media stream. Since the user is listening to a recorded stream, the user's presence state is set to available because the user can pause the recorded stream to take or initiate a communication.

In other embodiments, the action may be where the user pauses a live media stream, where the user mutes a live media stream, where the user listens to a live media stream, where the user listens to a live broadcast of a media stream, where the user listens to an interactive media stream. Based on the type of action and user configuration, the presence state can be updated accordingly. For example, if the media stream is live or interactive, the user may want their presence state set to busy. Alternatively, if the media stream is a broadcast media stream, the presence state can be set to busy, but interruptible because the user may be able to pause or mute the broadcast media stream.

In still other embodiments, the action may be where a required participant has not currently joined a communication (e.g., since a required participant has not joined, the user's presence is set to available until the required participant arrives), where a sub-communication is created from a sub-set of participants in a communication (e.g., based on who is in the sub-communication the user's presence state may change), where there is a relationship of the participants in a communication (e.g., the user's presence state is different based on the user's boss attending the meeting), based on a current location of the user in the communication (e.g., the user's presence state changes based on if the user being at home verses at work), the user listening to a video conference (e.g., setting the user's presence state to not interruptible because the user can be viewed by others verses an audio conference where the user is not being viewed), and the like.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   determining, by a processor, an activity associated with a first user;
   determining a presence state of the first user;
   determining, by the processor, an action associated with a media type of the activity or a role of the first user within the activity;
   in response to determining the action associated with the media type of the activity or the role of the first user associated within the activity, modifying, by the processor, the presence state of the first user, wherein the presence state is modified based on at least one of the following:
      the role of the first user associated within the activity changing based on an agenda of the activity and wherein the presence state is modified as the role of the first user changes within the activity; and
      the action associated with the media type of the activity is the first user's participation in a previous one of a reoccurring communication and wherein the presence state is modified based on the first user's participation in the previous one of the reoccurring communication; and
   communicating, by the processor, the modified presence state of the first user to a second user.

2. The method of claim 1, wherein the presence state is modified based on the role of the first user within the activity changing based on the agenda of the activity.

3. The method of claim 2, wherein the role of the first user within the activity is at least one of: a moderator, a presenter, a participant, a required participant, a scribe, and an optional participant.

4. The method of claim 1, wherein the presence state is modified based on the action associated with the media type of the activity.

5. The method of claim 4, wherein the action associated with the media type of the activity further comprises a percentage of time that the first user is talking during an audio or video communication and the presence state is modified based on the percentage of time that the first user is talking during the audio or video communication.

6. The method of claim 4, wherein the action associated with the media type of the activity is the first user's participation in the previous one of the reoccurring communication.

7. The method of claim 6, wherein the presence state is further modified based on a number of emails, text messages, voice mails, voice calls, or Instant Message sessions based on the reoccurring communication.

8. The method of claim 4, wherein the action associated with the media type of the activity is the first user listening to a recorded media stream and the presence state is further modified based on the first user listening to the recorded media stream.

9. The method of claim 4, wherein the action associated with the media type of the activity further comprises at least one of the following:
   the first user pausing a live media stream;
   the first user muting the live media stream;
   the first user listening to the live media stream;
   the first user listening to a live broadcast of a media stream;
   the first user listening to an interactive media stream; and
   the first user listening to a video conference.

10. The method of claim 4, wherein the action associated with the media type of the activity further comprises at least one of the following:
    a required participant not currently joining a voice, video, or text communication;
    a creation of a sub-communication of participants of the voice video or text communication;
    a relationship of the participants of the of the voice, video, or text communication; and
    a current location of the first user in the voice video or text communication.

11. A system comprising:
    an activity module configured to: (i) determine an activity associated with a first user;
    a media module configured to determine an action associated with a media type of the activity or a role of the first user associated within the activity; and
    a presence module configured to determine a presence state of the first user, wherein the presence state is modified based on at least one of the following: (a) the role of the first user associated within the activity changing based on an agenda of the activity and wherein the presence state is modified as the role of the first user changes within the activity; and (b) the action associated with the media type of the activity is the first user's participation in a previous one of a reoccurring communication and wherein the presence state is modified based on the first user's participation in the previous one of the reoccurring communication, (ii) modify the presence state of the first user based on (b) the action associated with the media type of the activity or (a) the role of the first user associated within the activity, and (iii) communicate the modified presence state of the first user to a second user.

12. The system of claim 11, wherein the presence state is modified based on the role of the first user within the activity changing based on the agenda of the activity.

13. The system of claim 11, wherein the presence state is modified based on the action associated with the media type of the activity.

14. The system of claim 13, wherein the action associated with the media type of the activity further comprises a percentage of time that the first user is talking during an audio or video communication and the presence state is modified based on the percentage of time that the first user is talking during the audio or video communication.

15. The system of claim 13, wherein the action associated with the media type of the activity is the first user's participation in the previous one of the reoccurring communication.

16. The system of claim 13, wherein the action associated with the media type of the activity further comprises at least one of the following:
 the first user pausing a live media stream;
 the first user muting the live media stream;
 the first user listening to the live media stream;
 the first user listening to a live broadcast of a media stream;
 the first user listening to an interactive media stream; and
 the first user listening to a video conference.

17. The system of claim 13, wherein the action associated with the media type of the activity further comprises at least one of the following:
 a required participant not currently joining a voice, video, or text communication;
 a creation of a sub-communication of participants of the voice video or text communication;
 a relationship of the participants of the of the voice, video, or text communication; and
 a current location of the first user in the voice video or text communication.

18. A non-transient computer readable medium having stored thereon instructions that cause a processor to execute a method, the method comprising:
 instructions to determine an activity associated with a first user;
 instructions to determine a presence state of the first user;
 instructions to determine an action associated with a media type of the activity or a role of the first user associated within the activity;
 instructions to modify the presence state of the first user in response to determining the action associated with the media type of the activity or the role of the first user associated within the activity, wherein the presence state is modified based on at least one of the following:
  the role of the first user associated within the activity changing based on an agenda of the activity and wherein the presence state is modified as the role of the first user changes within the activity; and
  the action associated with the media type of the activity is the first user's participation in a previous one of a reoccurring communication and wherein the presence state is modified based on the first user's participation in the previous one of the reoccurring communication; and
 instructions to communicate the modified presence state of the first user to a second user.

19. The non-transient computer readable medium of claim 18, wherein the action associated with the media type of the activity further comprises a percentage of time that the first user is talking during an audio or video communication and the presence state is further modified based on the percentage of time that the first user is talking during the audio or video communication.

20. The non-transient computer readable medium of claim 18, wherein the action associated with the media type of the activity further comprises least one of the following:
 the first user pausing a live media stream;
 the first user muting the live media stream;
 the first user listening to the live media stream;
 the first user listening to a live broadcast of a media stream;
 the first user listening to an interactive media stream; and
 the first user listening to a video conference.

* * * * *